US011800169B2

(12) United States Patent
Berry et al.

(10) Patent No.: US 11,800,169 B2
(45) Date of Patent: Oct. 24, 2023

(54) SYSTEMS AND METHODS FOR USING VIDEO METADATA TO ASSOCIATE ADVERTISEMENTS THEREWITH

(71) Applicant: TiVo Solutions Inc., San Jose, CA (US)

(72) Inventors: Matthew G. Berry, Raleig, NC (US); Benjamin J. Weinberger, Durham, NC (US); Schuyler E. Eckstrom, Beaufort, SC (US); Albert L. Segars, Beaufort, SC (US)

(73) Assignee: TiVo Solutions Inc., San Jose, CA (US)

( * ) Notice: Subject to any disclaimer, the term of this patent is extended or adjusted under 35 U.S.C. 154(b) by 534 days.

(21) Appl. No.: 15/045,223

(22) Filed: Feb. 16, 2016

(65) Prior Publication Data

US 2016/0165288 A1 Jun. 9, 2016

Related U.S. Application Data

(63) Continuation of application No. 12/206,622, filed on Sep. 8, 2008, now abandoned.

(Continued)

(51) Int. Cl.
*G06Q 30/00* (2023.01)
*H04N 21/2668* (2011.01)

(Continued)

(52) U.S. Cl.
CPC ......... *H04N 21/2668* (2013.01); *G06F 16/40* (2019.01); *G06F 16/58* (2019.01);

(Continued)

(58) Field of Classification Search
CPC .............. G06F 16/58; H04N 21/44008; H04N 21/8456; H04N 21/2353; H04N 21/845;

(Continued)

(56) References Cited

U.S. PATENT DOCUMENTS 8,171,509 B1 * 5/2012 Girouard .............. H04N 21/812 725/32
2002/0035732 A1 * 3/2002 Zetts .................... G11B 27/034 375/E7.278

(Continued)

FOREIGN PATENT DOCUMENTS

WO WO-2007139889 A2 * 12/2007 ............. G06F 21/10

OTHER PUBLICATIONS

Lugmayr, Artur R., et al. "Manipulating premarked rectangular areas in a real-time digiTV stream utilizing MPEG-7 metadata descriptors." Internet Multimedia Management Systems III. vol. 4862. International Society for Optics and Photonics, 2002. (Year: 2002).*

(Continued)

*Primary Examiner* — Michael Bekerman
(74) *Attorney, Agent, or Firm* — HALEY GUILIANO LLP

(57) ABSTRACT

A system for using metadata from a video signal to associate advertisements therewith, comprising (i) a segmentation system to divide the video signal into video clips, (ii) a digitizing system for digitizing the video clips, (iii) a feature extraction system for extracting audio and video features from each video clip, associating each audio feature with respective video clips, associating each video feature with respective video clips, and saving the audio and video features into an associated metadata file, (iv) a web interface to the feature extraction system for receiving the video clips, and (v) a database, wherein video signals and associated metadata files are stored and indexed, wherein the associated metadata file is provided when a video player requests the corresponding video signal, enabling selection of a relevant advertisement for presentment in conjunction with respec- (Continued)

tive video clips based on the associated audio and video features of the respective video clip.

24 Claims, 11 Drawing Sheets

Related U.S. Application Data

(60) Provisional application No. 60/970,593, filed on Sep. 7, 2007.

(51) Int. Cl.

| | |
|---|---|
| ***G06F 16/40*** | (2019.01) |
| ***G06F 16/58*** | (2019.01) |
| ***G06F 16/71*** | (2019.01) |
| ***G06Q 30/02*** | (2023.01) |
| ***G06Q 30/0241*** | (2023.01) |
| ***G11B 27/10*** | (2006.01) |
| ***G11B 27/28*** | (2006.01) |
| ***G11B 27/32*** | (2006.01) |
| ***H04H 60/07*** | (2008.01) |
| ***H04H 60/27*** | (2008.01) |
| ***H04H 60/37*** | (2008.01) |
| ***H04H 60/58*** | (2008.01) |
| ***H04H 60/59*** | (2008.01) |
| ***H04H 60/61*** | (2008.01) |
| ***H04H 60/73*** | (2008.01) |
| ***H04N 7/16*** | (2011.01) |
| ***H04N 9/82*** | (2006.01) |
| ***H04N 9/87*** | (2006.01) |
| ***H04N 21/234*** | (2011.01) |
| ***H04N 21/266*** | (2011.01) |
| ***H04N 21/434*** | (2011.01) |
| ***H04N 21/435*** | (2011.01) |
| ***H04N 21/439*** | (2011.01) |
| ***H04N 21/462*** | (2011.01) |
| ***H04N 21/478*** | (2011.01) |
| ***H04N 21/835*** | (2011.01) |
| ***H04N 21/84*** | (2011.01) |
| ***H04N 21/845*** | (2011.01) |
| ***G06Q 30/0251*** | (2023.01) |
| ***H04N 21/81*** | (2011.01) |
| ***H04N 21/235*** | (2011.01) |
| ***H04N 21/254*** | (2011.01) |
| ***H04N 21/433*** | (2011.01) |
| ***H04N 21/44*** | (2011.01) |

(52) U.S. Cl.

CPC ............ *G06F 16/71* (2019.01); *G06Q 30/02* (2013.01); *G06Q 30/0264* (2013.01); *G06Q 30/0277* (2013.01); *G11B 27/105* (2013.01); *G11B 27/28* (2013.01); *G11B 27/322* (2013.01); *H04H 60/07* (2013.01); *H04H 60/27* (2013.01); *H04H 60/37* (2013.01); *H04H 60/58* (2013.01); *H04H 60/59* (2013.01); *H04H 60/61* (2013.01); *H04H 60/73* (2013.01); *H04N 7/162* (2013.01); *H04N 9/8205* (2013.01); *H04N 9/8227* (2013.01); *H04N 9/8715* (2013.01); *H04N 21/2353* (2013.01); *H04N 21/23418* (2013.01); *H04N 21/254* (2013.01); *H04N 21/26603* (2013.01); *H04N 21/434* (2013.01); *H04N 21/435* (2013.01); *H04N 21/4331* (2013.01); *H04N 21/4394* (2013.01); *H04N 21/44008* (2013.01); *H04N 21/4622* (2013.01); *H04N 21/478* (2013.01); *H04N 21/812* (2013.01); *H04N 21/835* (2013.01); *H04N 21/84* (2013.01); *H04N 21/845* (2013.01); *H04N 21/8453* (2013.01); *H04N 21/8456* (2013.01)

(58) Field of Classification Search

CPC .... G06Q 30/02; G06Q 30/0277; H04H 60/37; H04H 60/58; H04H 60/59

See application file for complete search history.

(56) References Cited

U.S. PATENT DOCUMENTS

| | | | | |
|---|---|---|---|---|
| 2002/0108112 | A1* | 8/2002 | Wallace ............ | G06F 17/30793 725/40 |
| 2007/0033531 | A1* | 2/2007 | Marsh .................... | G06Q 30/02 707/E17.108 |
| 2007/0078713 | A1* | 4/2007 | Ottt ........................ | G06Q 30/02 705/14.72 |
| 2007/0083537 | A1* | 4/2007 | Martinez ................. | G06F 16/48 |
| 2007/0106685 | A1* | 5/2007 | Houh ...................... | G06F 16/43 707/999.102 |
| 2007/0106760 | A1* | 5/2007 | Houh .................. | G06F 16/7834 709/219 |
| 2007/0157249 | A1 | 7/2007 | Cordray et al. | |
| 2008/0120646 | A1* | 5/2008 | Stern ...................... | G06Q 30/02 725/34 |
| 2008/0140385 | A1* | 6/2008 | Mahajan ............. | G06F 16/7834 704/251 |
| 2008/0172293 | A1 | 7/2008 | Raskin et al. | |
| 2009/0012995 | A1* | 1/2009 | Sartor ................ | H04N 21/2187 |
| 2009/0125510 | A1* | 5/2009 | Graham ................ | G06F 16/437 |
| 2009/0138906 | A1* | 5/2009 | Eide ................... | G06Q 30/0264 725/32 |
| 2010/0228626 | A1* | 9/2010 | Im ...................... | G06Q 30/0251 705/14.49 |
| 2015/0245111 | A1 | 8/2015 | Berry et al. | |

OTHER PUBLICATIONS

Bolettieri, Paolo, et al. "Automatic metadata extraction and indexing for reusing e-learning multimedia objects." Workshop on multimedia information retrieval on The many faces of multimedia semantics. 2007. (Year: 2007).*

Duval, Erik, and Wayne Hodgins. "Metadata matters." Proceedings of the International Conference on Dublin Core and Metadata Applications. 2004. (Year: 2004).*

Oliphant, Andrew, and Bryher Scudamore. "TV gets personal [personal video recorders]." IEE Review 47.5 (2001): 9-13. (Year: 2001).*

Erdogan, Engin. "An On-Demand Advertising Model for Interactive Television." Masters Project, Information Design and Technology, Georgia Institute of Technology, Available at,(Apr. 2004) (2004): 1-35. (Year: 2004).*

United States Patent and Trademark Office, U.S. Appl. No. 12/206,622, Final Office Action dated Jan. 28, 2014, dated Jan. 28, 2014.

United States Patent and Trademark Office, U.S. Appl. No. 14/707,440, Non-Final Office Action dated Jun. 10, 2015, dated Jun. 10, 2015.

United States Patent and Trademark Office, U.S. Appl. No. 14/707,440, Final Office Action dated Dec. 4, 2015, dated Dec. 4, 2015.

United States Patent and Trademark Office, U.S. Appl. No. 14/707,440, Examiner's Answer dated Nov. 2, 2016, dated Nov. 2, 2016.

* cited by examiner

```
502 →  <?xml version="1.0" encoding="ISO-8859-1" ?>
504 →  - <video_txt videoID="VidSig_ID:C26287BC89BC5D7D">
506 →      <filename>beachvacation.flv</filename>
508 →      <fingerprint>C26287BC89BC5D7D</fingerprint>
510 →      <video_length>00:02:15</video_length>
512 →      <processor_version>0.0.1</processor_version>
514 →      <keyword_list>beach vacation</keyword_list>
516 →  - <timecoded_transcript>
518 →    - <segment>
520 →      - <timecode>
522 →            <start>00:00:00</start>
524 →            <stop>00:00:27</stop>
526 →          </timecode>
528 →          <context>relaxing beach</context>
530 →            <scene>beach outdoor</scene>
532 →          - <characters>
534 →              <character>Joe Somebody</character>
                   <character>Jill Anybody</character>
536 →            </characters>
538 →          <objects>towel ball chair</objects>
540 →        </segment>
         - <segment>
         -   <timecode>
               <start>00:00:28</start>
               <stop>00:01:17</stop>
             </timecode>
             <context>relaxing refreshment drink beach</context>
             <scene>beach outdoor</scene>
           - <characters>
               <character>Joe Somebody</character>
               <character>Jill Anybody</character>
             </characters>
             <objects>coke soda</objects>
           </segment>
     • • • • • •
```

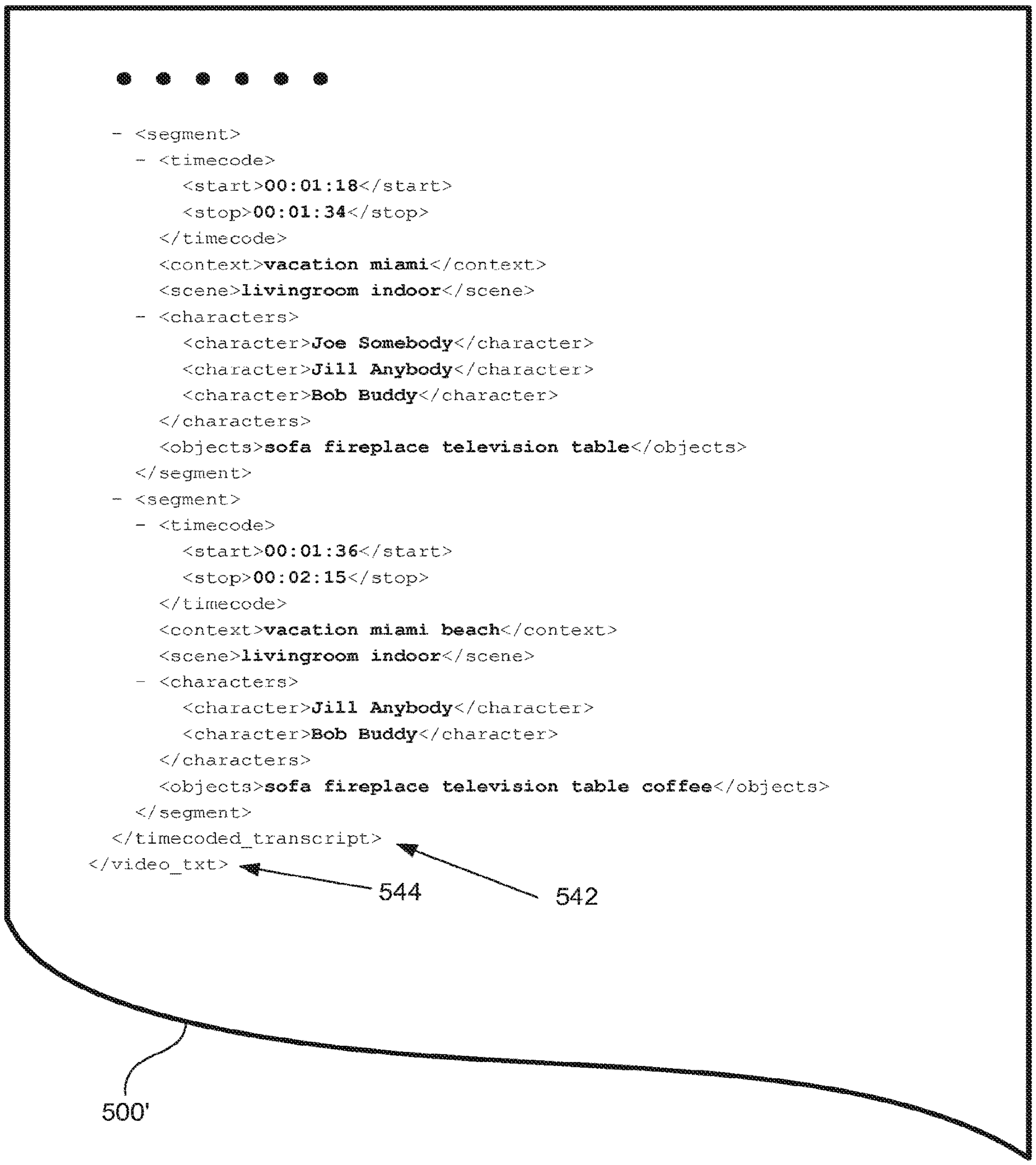

FIG. 5B

```xml
• • • • • •
- <segment>
    - <timecode>
        <start>00:01:18</start>
        <stop>00:01:34</stop>
      </timecode>
      <context>vacation miami</context>
      <scene>livingroom indoor</scene>
    - <characters>
        <character>Joe Somebody</character>
        <character>Jill Anybody</character>
        <character>Bob Buddy</character>
      </characters>
      <objects>sofa fireplace television table</objects>
  </segment>
- <segment>
    - <timecode>
        <start>00:01:36</start>
        <stop>00:02:15</stop>
      </timecode>
      <context>vacation miami beach</context>
      <scene>livingroom indoor</scene>
    - <characters>
        <character>Jill Anybody</character>
        <character>Bob Buddy</character>
      </characters>
      <objects>sofa fireplace television table coffee</objects>
  </segment>
  </timecoded_transcript>
</video_txt>
```

SYSTEMS AND METHODS FOR USING VIDEO METADATA TO ASSOCIATE ADVERTISEMENTS THEREWITH

CROSS-REFERENCE TO RELATED APPLICATIONS

This application is a Continuation of U.S. patent application Ser. No. 12/206,622, filed Sep. 8, 2008, which claims the benefit under 35 U.S.C. § 119(e) of U.S. Provisional Patent Application Ser. No. 60/970,593, entitled "Systems and Methods for Using Video Metadata to Associate Advertisements Therewith," filed Sep. 7, 2007. The entire contents of the above mentioned applications are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application.

TECHNICAL FIELD

The present invention relates generally to targeted advertisements and, more particularly, to methods and systems for delivering targeted advertisements in association with a video program based on metadata associated with the video program.

BACKGROUND

An advertisement promotes the goods, services, organizations, ideas, etc. of an organization or company via a media. Traditional advertisements were made on printed materials and were available on pamphlets, flyers, billboards, posters, newspapers, and magazines. As electronic technology developed, commercials were incorporated into multimedia content, such as radio, television, and movies and were typically presented as an interruption of the primary content—occurring either before the primary content or at intervals during the primary content. Today, advertisements are placed within television programs and movies through product placements and are available on the Internet and on electronically stored content (e.g., DVDs), such as in commercials, trailers, and in promotions on DVDs.

Traditional advertisements have typically targeted general audiences. Such advertisements can be tailored somewhat to the audience likely to be watching a movie, television program or show or event, or radio station or program based on the general content of the program or show and based on the likely demographic of the audience who would be expected to watch such program or show. The Internet provides advertisers with a more specific targeted audience and, hence, higher potential return on their advertisement expenses. For example, because each computer contains potentially trackable and usable information about user(s) of that computer (e.g., through the use of cookies, location information, language settings, and prior web sites accessed), Internet websites are able to use such information to generate banner or pop-up advertisements that are based on some information available about potential users of each computer. In yet another example, Internet search engine sites are able to "sell" the terms or keywords used by an Internet searcher to present targeted advertisements that have been associated with specific keywords or search terms. Such advertisements are presented in pop-up windows, banner advertisement windows, or as "sponsored" links to websites that have requested and paid for prominent placements on the search results screen for specific keywords or search terms. An Internet user that searches "keywords" is more likely than a member of the general public to be a potential customer of a good or services associated with such keywords.

With the continuing advance of technology, bandwidth, and availability of broadband access, online video viewing is becoming increasingly popular and promises to become even more prevalent with the continuing expansion and use of IPTV and video on demand. Unlike static or substantially-static content (text, photographs) that is typically available on a webpage, that gets updated only periodically (more frequently for a news webpage and much less frequently for a standard company webpage), and that sustains a particular viewer for only a brief amount of time, commercial videos over the Internet provide an opportunity to capture a viewing audience for a substantially longer amount of time. However, audiences that are used to watching movies and television on DVDs or off of a DVR are unwilling to view conventional advertisements that interrupt the flow of the video stream.

For these and many other reasons, there is a need for a technology platform that is able to provide and display advertisements that are targeted to the specific audience and that are tied to specific programming being viewed. There is a need for methods and systems that enable such advertisements to be viewed selectively and simultaneously with the primary content in such a way that does not interfere with the primary content. There are yet further needs for methods and systems that provide real-time advertisements for the viewer regardless of whether the viewer is accessing the content from off of the Internet or from a DVD or similar electronic media storage if the display device has access to the Internet.

Therefore, it is apparent that a heretofore unaddressed need exists in the art to address the aforementioned deficiencies and inadequacies.

SUMMARY

The present invention, in one aspect, relates to a method for using metadata from a video signal to associate advertisements therewith. In one embodiment, the method includes (i) segmenting the video signal into a plurality of video clips, (ii) extracting audio and video features from a video signal, (iii) digitizing the plurality of video clips, (iv) identifying extracted audio features within respective digitized video clips using audio processing, wherein each audio feature is associated with the respective digitized video clip, (v) identifying extracted video features within respective digitized video clips using visual processing, wherein each video feature is associated with the respective digitized video clip, (vi) saving the associated audio features and associated video features in a metadata file, (vii) associating the metadata file with the video signal, (viii) storing the metadata file in a database, and (ix) providing the associated metadata file when a video player requests the corresponding video signal. The associated metadata file enables selection of a relevant advertisement for presentment in conjunction with each respective digitized video clip of the corresponding video signal based on the associated audio features and the associated video features of the respective digitized video clip.

The video features includes at least one of (i) one or more people, (ii) one or more characters, (iii) one or more animals, (iv) one or more objects, (v) one or more geographic locations, (vi) background, (vii) one or more scene, or a combination of these features. In one embodiment, these video features are extracted by a visual processing system of the feature extraction system. In another embodiment, the method includes the step of identifying and recognizing one or more objects from the video signal by an object classification system of the feature extraction system. In yet another embodiment, the method includes the step of identifying and recognizing one or more scenes from the video signal by a scene classification system of the feature extraction system. In yet another embodiment, the method includes a combination of both steps.

In one embodiment, the video signal may contain accompanying audio signal. Audio features of the audio signal includes at least one of (i) a list of one or more words, (ii) speeches by one or more people, (iii) dialogue by one or more people, (iv) music, (v) background sound, and a combination of these audio features. In another embodiment, the method further includes the steps of: (i) identifying and recognizing one or more background sounds from the audio signal by using a sound classification system of the feature extraction system, (ii) identify and recognizing one or more music segments from the audio signal by using a music classification system of the feature extraction system, and (iii) identifying and recognizing human speech, dialogues, one or more words, one or more phrases by using a speech recognition system of the feature extraction system. In yet another embodiment, the method further includes the steps of: (i) collecting audio features of the audio signal by using audio signal recognition system of the feature extraction system, and (ii) saving the collected audio features in the metadata file.

In one embodiment, the metadata file is an XML file. The metadata file contains one or more of (i) video identification information, (ii) a file name, (iii) a digital signature, (iv) the length of the video signal, (v) a keyword list, (vi) a time-coded transcript, (vii) one or more segments with a corresponding start and stop time, (viii) one or more contents, (ix) one or more characters, (x) one or more animals, (xi) one or more objects, and (xii) a list of vocabulary.

In another aspect, the present invention relates to a system for using metadata from a video signal to associate advertisements therewith. In one embodiment, the system has (i) a segmentation system for dividing the video signal into a plurality of video clips, (ii) a digitizing system for digitizing the plurality of video clips, (iii) a feature extraction system for extracting audio features and video features from each digitized video clip, associating each audio feature with at least one digitized video clip, associating each video feature with at least one digitized video clip, and saving the audio features and video features into a metadata file associated with the video signal, (iv) a web interface to the feature extraction system for receiving the digitized video clips, and (v) a database accessible by a third party user, wherein video signals and associated metadata files are stored and indexed with a unique filename for each video signal in the database and its corresponding video signal. The associated metadata file is provided when a video player requests the corresponding video signal, and enables selection of a relevant advertisement for presentment in conjunction with each respective digitized video clip of the corresponding video signal based on the associated audio features and the associated video features of the respective digitized video clip.

In one embodiment, the video features comprise at least one of (i) one or more people, (ii) one or more characters, (iii) one or more animals, (iv) one or more objects, (v) one or more geographic locations, (vi) background, (vii) one or more scenes, and (viii) any combination thereof. In another embodiment, the video signal includes an accompanying audio signal.

In another embodiment, the audio features of the audio signal comprise one or more of (i) a list of one or more words, (ii) speeches by one or more people, (iii) dialogue by one or more people, (iv) music, (v) background sound, and (vi) any combination thereof. In one feature, the feature extraction system further comprises an audio signal recognition (ASR) system to identify and recognize the audio features of the video signal, and a visual processing system to identify and recognize the visual features of the video signal. In another feature, the visual processing system further comprises a object classification system to identify and recognize one or more objects from the video signal, and a scene classification system to identify and recognize one or more scenes from the video signal. In yet a further feature, the audio signal recognition system further comprises a sound classification system to identify and recognize one or more background sounds from the audio signal, and a music classification system to identify and recognize one or more music segments from the audio signal, and a speech recognition system to identify and recognize human speech, dialogues, one or more words, one or more phrases. In another feature, the metadata file comprises one or more of video identification information, a file name, a digital signature, the length of the video signal, a keyword list, a time-coded transcript, one or more segments with a corresponding start and stop time, one or more contents, one or more characters, one or more pets, one or more objects, and a list of vocabulary.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIGS. 5A and 5B illustrate one exemplary meta data file generated and used within the present invention.

DETAILED DESCRIPTION

Figure 1A:
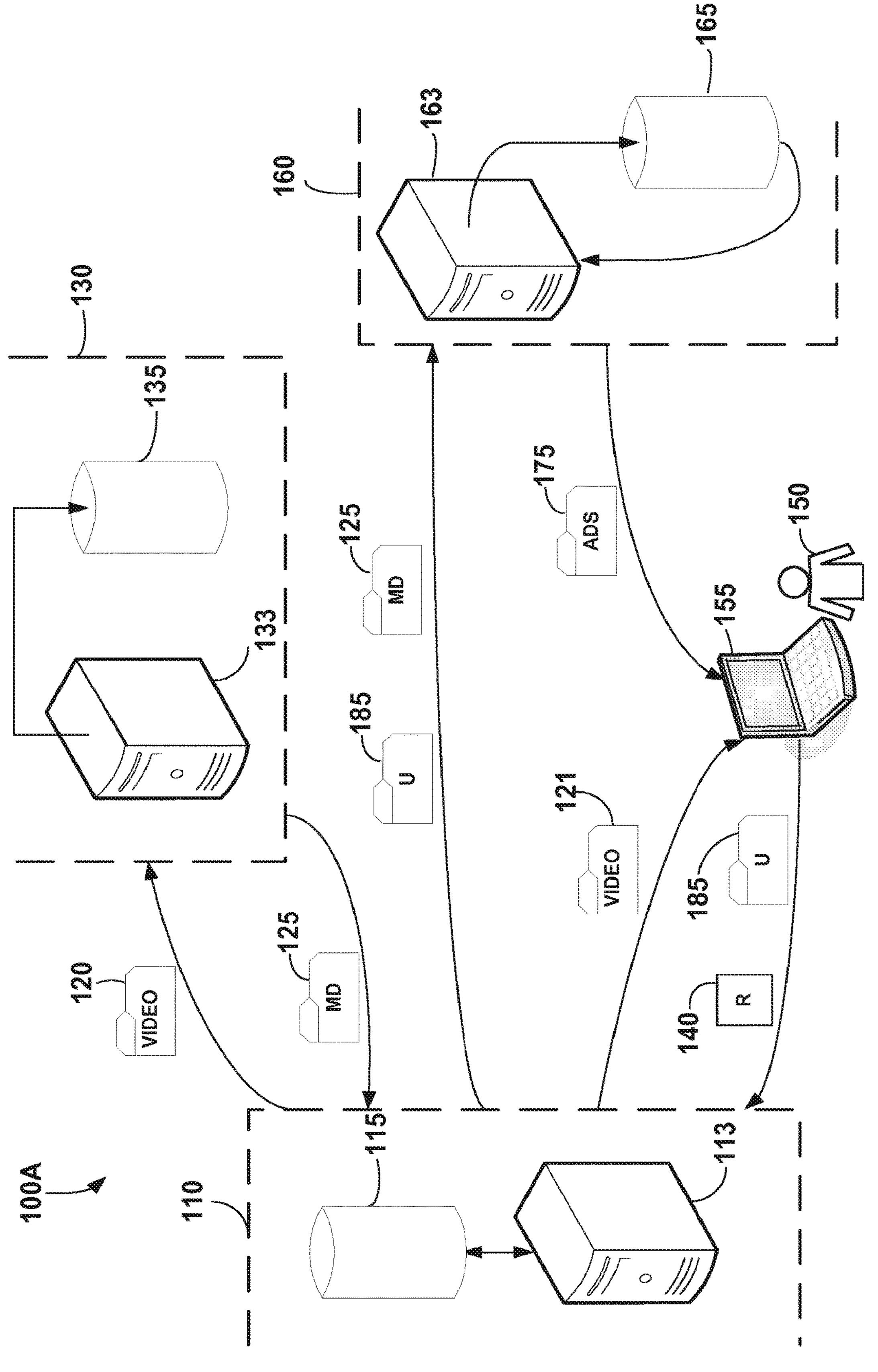
FIG. 1A illustrates a first embodiment of an advertisement placement system of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, a video program refers to any multimedia content, such as a movie, a television program, an event, a video, an advertisement, a broadcast, or the like that a user would be interested in viewing online or in recorded format.

Turning now to FIG. 1A, a first preferred embodiment of an advertisement placement system 100A based primarily upon time-coded metadata associated with an underlying video program displayed therewith is illustrated. In this first embodiment, it is contemplated that the video program will be viewed in a Video-on-Demand (VOD) or video streaming context from a video provider 110 and that the underlying metadata file associated with the video program, once created, is maintained by the video provider 110. This system 100A includes one or more video storage databases 115 of the video provider 110 and a video server 113 that provides video programs in VOD or video streaming format over a computer network, such as the Internet for example, to a viewer 150 (or end user).

Before a specific video is provided to the viewer 150, a video file 120 associated with the video program 121 is preferably provided to a metadata generator 130. The video file 120 has or includes a unique file name or other video identifier (designated herein by the variable VID). As will be described in greater detail hereinafter, the metadata generator 130 receives the video file 120 and, using a metadata processor 133, creates or generates a time-coded metadata file 125 associated with the corresponding video file 120 and underlying video program 121. As shown in FIG. 1A, this metadata file 125 is stored in a database 135 of the metadata generator 130 but also provided back to the video provider 110 and associated with the corresponding video file 120 and underlying video program 121 in video storage databases 115.

When a request 140 for VOD or video streaming of the video program 121 associated with the video file 120 is received from a video display device 155 (such as a computer, Internet or interactive TV, or similar video playback or viewing device) of the viewer 150, the video provider 110 begins providing access to the video program 121 in conventional fashion (i.e., this assumes all communication and billing parameters are already or previously satisfied; such communication and billing parameters being beyond the scope of the present invention but within the scope and understanding of those skilled in the art). Simultaneously or substantially simultaneously with the start of the video streaming, the metadata file 125 associated with the video file 120 is provided to an advertisement distributor 160, which uses an advertisement server 163 to process the metadata file 125 to selectively identify one or more appropriate advertisements from its database 165 of potential advertisements that is appropriate to provide in conjunction with the video program 121 and, specifically, with each discrete segment of the video program 121 based on its time-coded metadata. The selected advertisement file(s) 175 are then provided to the video display device 155 of the viewer 150. The metadata file 125 may be provided in whole to the advertisement distributor 160 or it may be parsed and provided in piece meal or "as needed" fashion to the advertisement distributor 160.

Figure 2:
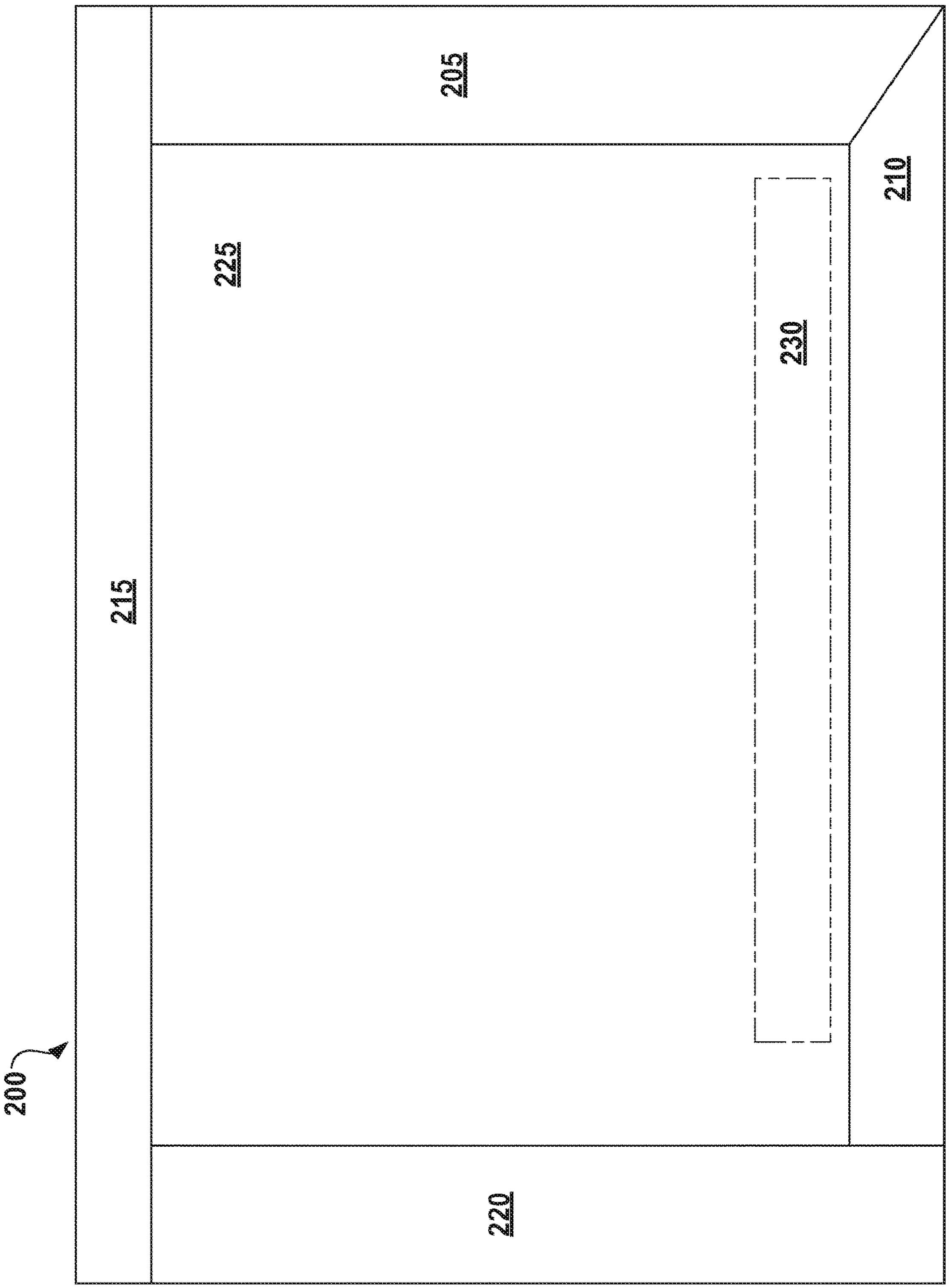
FIG. 2 illustrates one representative display screen for viewing a video program and advertisements associated herewith based on underlying time-coded metadata.

Preferably, as shown in FIG. 2, the video display 200 of the video display device 155 is configured to receive and display various types of advertisements in conjunction with the actual video display. Such advertisements are preferably displayed in manners that do not interrupt or delay viewing of the requested video, as would a conventional commercial shown on broadcast television. For example, such advertisements may be shown as conventional banner ads that appear (i) in an optional vertical side window or panel 205 or (ii) in an optional horizontal window or panel 210 that do not interfere with the main video display area 225. The video display 200 may also include conventional header areas and menu control areas 215, 220. Obviously, the placement and purpose of each of the windows and panels of the video display 200 are within the purview of those skilled in the art. In addition, although the advertisements can be displayed as banner ads, it is also possible and expected that alternative advertisements, such as interstitial ads, bug ads, or hyperlinks that can be opened or accessed by the viewer 150, may be used alternatively or in conjunction with the banner advertisements. Such additional advertisements may be placed within the main video display area 225, such as in the lower portion 230 of the main video display area 225. In addition, it should also be understood that while "advertisements" are being used generally to define the information that may be displayed around and during the video playback, it is also possible and expected that other information associated with the video playback, such as background information, more detailed information about the video program, the actors in the video program, scenes, events or locations that appear in the video program, related videos or information, and the like, can be displayed, advertised, or linked during the playback and tied to the current time-code of the video as it is being viewed. Such advertisements can be text, still graphics, videos, audio, hyperlinks, or the like. In some embodiments, the advertisements merely display information. In other embodiments, the advertisements include a hyperlink that, when activated, pause the primary video and allow the user to view or access the advertisement or other additional information.

Although not shown in FIG. 1A, as the video program 121 is being viewed by the viewer 150, the actual time-code of the video program 121 is provided either from the video provider 110 or, preferably, from the video display device 155 itself. This time-code information associated with the actual viewing of the video program 121 either is provided in real time to the advertisement distributor 160 so that appropriate advertisement files 175 can be provided back to the video display device 155 in real time or, alternatively, is provided in advance to the video display device 155 for caching and later access at the appropriate time, based on the time-code location of the video program 121 as it is being viewed.

In an optional embodiment of that shown in FIG. 1A, user or video display device characteristics 185 are obtainable from the video display device 155 and may be provided to the advertisement distributor 160. Such user or video display device characteristics 185 typically include location, age, gender, interests, Internet websites visited, and other similar demographic data that may be obtained from cookies or similar tracking information. The advertisement distributor 160 utilizes the video display device characteristics 185 to generate advertisement files 175 that are further targeted and customized for the viewer 150. The advertisement files 175 are provided back to the video display device 155 for display during viewing of the video program 121. Such targeted advertisements are still shown and synchronized with the time-coded video program 121; however, the user data 185 enables the advertisement server 163 to select more accurately between one or more potentially valid advertisements that could be associated with the video program for a particular time-coded segment.

Figure 1B:
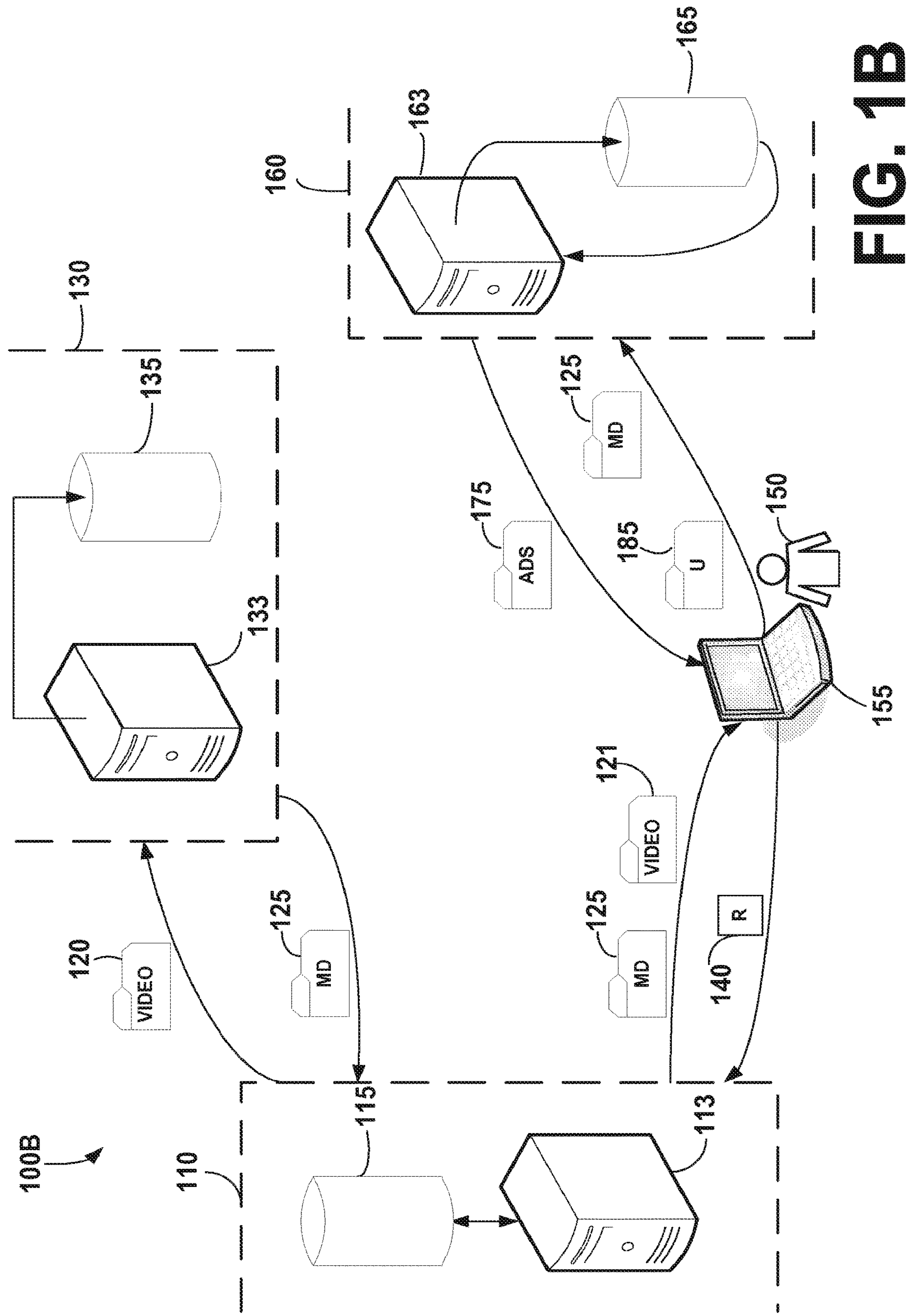
FIG. 1B illustrates a second embodiment of an advertisement placement system of the present invention.

Turning now to FIG. 1B, a second preferred embodiment of an advertisement placement system 100B based primarily upon time-coded metadata associated with an underlying video program displayed therewith is illustrated. In this embodiment, it is contemplated that the video program is still viewed in a Video-on-Demand (VOD) or video streaming context from a video provider 110; however, unlike the first embodiment, in this scenario, the underlying metadata file 125 associated with the video program 121 is sent to the video display device 155 along with the video program 121. The video display device 155 (or at least the video player system/software installed on the video display device) then sends the metadata file 125 (or parsed segments thereof at appropriate time intervals) to the advertisement distributor 160 so that appropriate advertisement file(s) 175 are returned back to the player 155. Again, optionally, user data 185 may be provided from the video display device 155 to the advertisement distributor 160 to enable the advertisement server 163 to select more accurately between one or more potentially valid advertisements that could be associated with the video program for a particular time-coded segment.

Figure 1C:
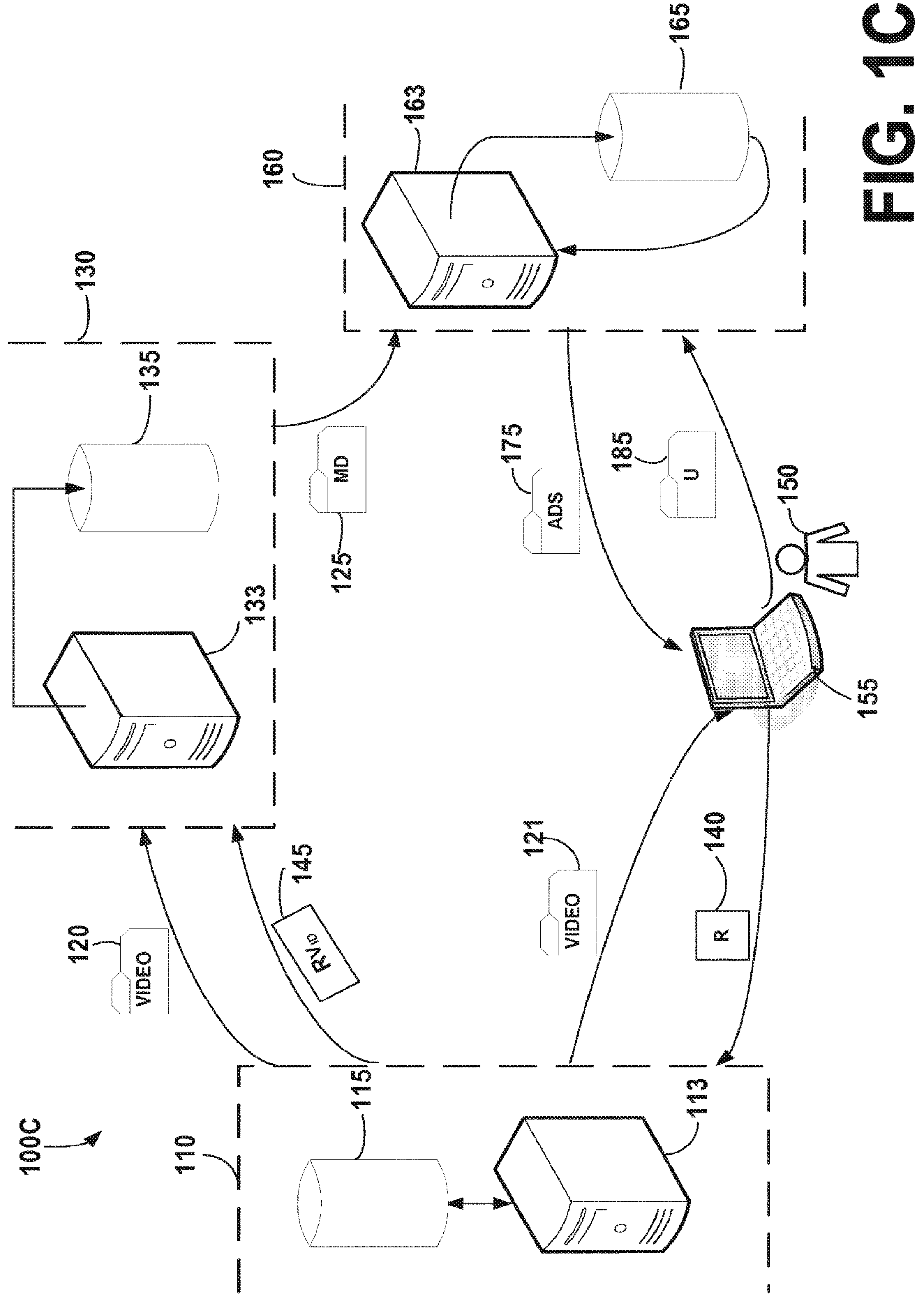
FIG. 1C illustrates a third embodiment of an advertisement placement system of the present invention.

Turning now to FIG. 1C, a third preferred embodiment of an advertisement placement system 100C based primarily upon time-coded metadata associated with an underlying video program displayed therewith is illustrated. In this embodiment, it is contemplated that the video program is also viewed in a Video-on-Demand (VOD) or video streaming context from a video provider 110; however, unlike the first and second embodiments, in this scenario, the underlying metadata file 125 associated with the video program 121, once created, is not provided back to the video provider 110. This embodiment is similar in most respects to the first embodiment; however, when a request for video 140 is received from the viewer 150, the video provider 110 sends a request 145 for metadata file 125 associated with the video program 121. This request 145 is either sent directly to the metadata generator 130 (as shown) or (as not shown) to the advertisement distributor 160 first, which then requests the same from the metadata generator 130. The metadata generator 130 then retrieves the appropriate time-coded metadata file 125 from its database 135 and provides it to the advertisement distributor 160. The remaining aspects, variations, and alternatives of this embodiment are similar to those discussed in association with the first embodiment.

Figure 1D:
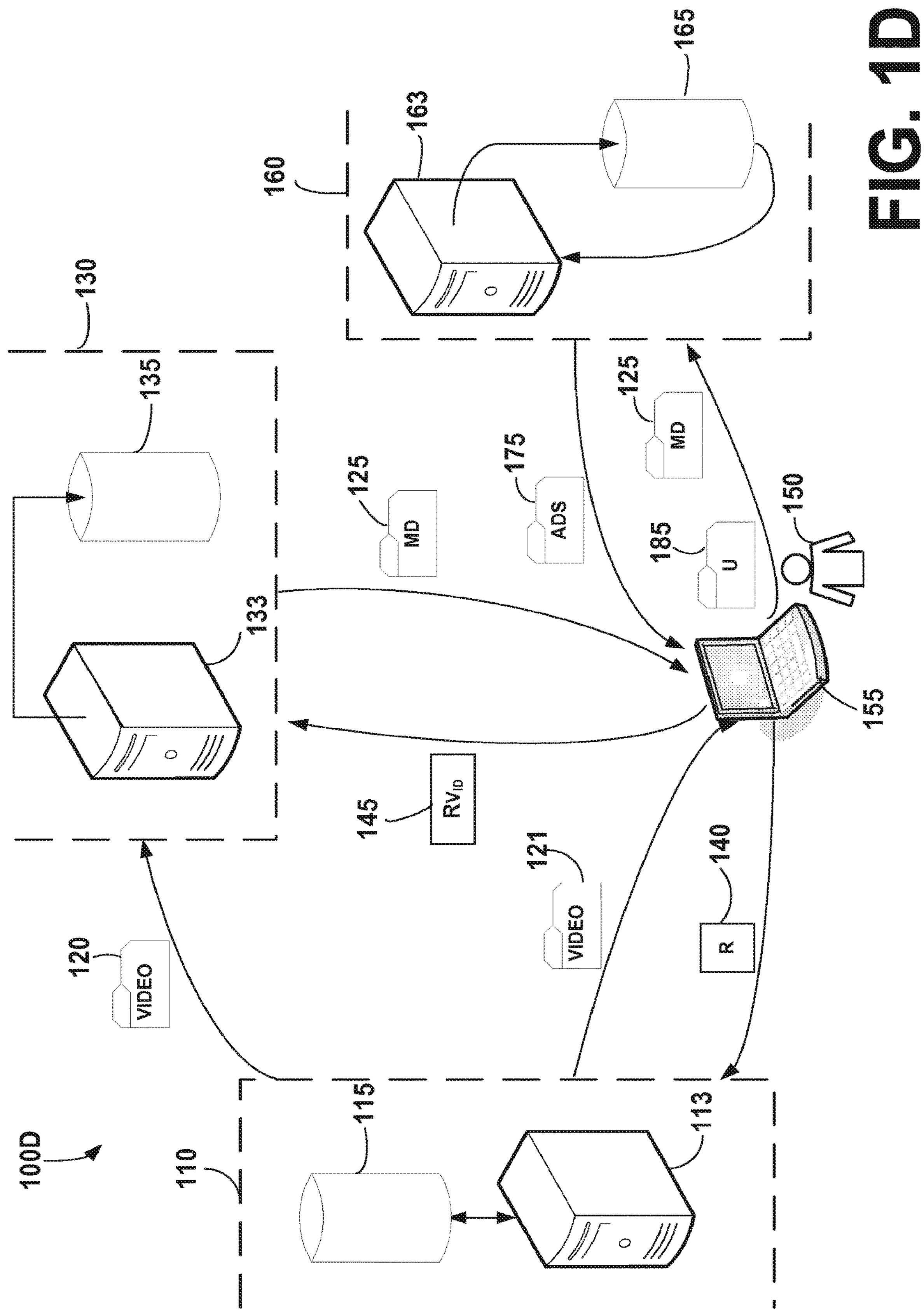
FIG. 1D illustrates a fourth embodiment of an advertisement placement system of the present invention.

Turning now to FIG. 1D, a fourth embodiment is illustrated, which is another variation of the embodiment shown in FIG. 1C. Again, the metadata file 125 is maintained by the metadata generator 130, but upon receipt of a request 145, this time from the video display device 155, the metadata file 125 is provided to the video display device 155 and provided, preferably in parsed or "as needed" basis to the advertisement distributor 160. In another slight alternative arrangement, in response to the request 145 (or series of requests containing the video ID and time code location) from the video display device 155, the metadata generator 130 may provide the "as needed" portion of the metadata file 125 to the advertisement distributor 160 corresponding to the video segment being viewed by the viewer 150.

Figure 1E:
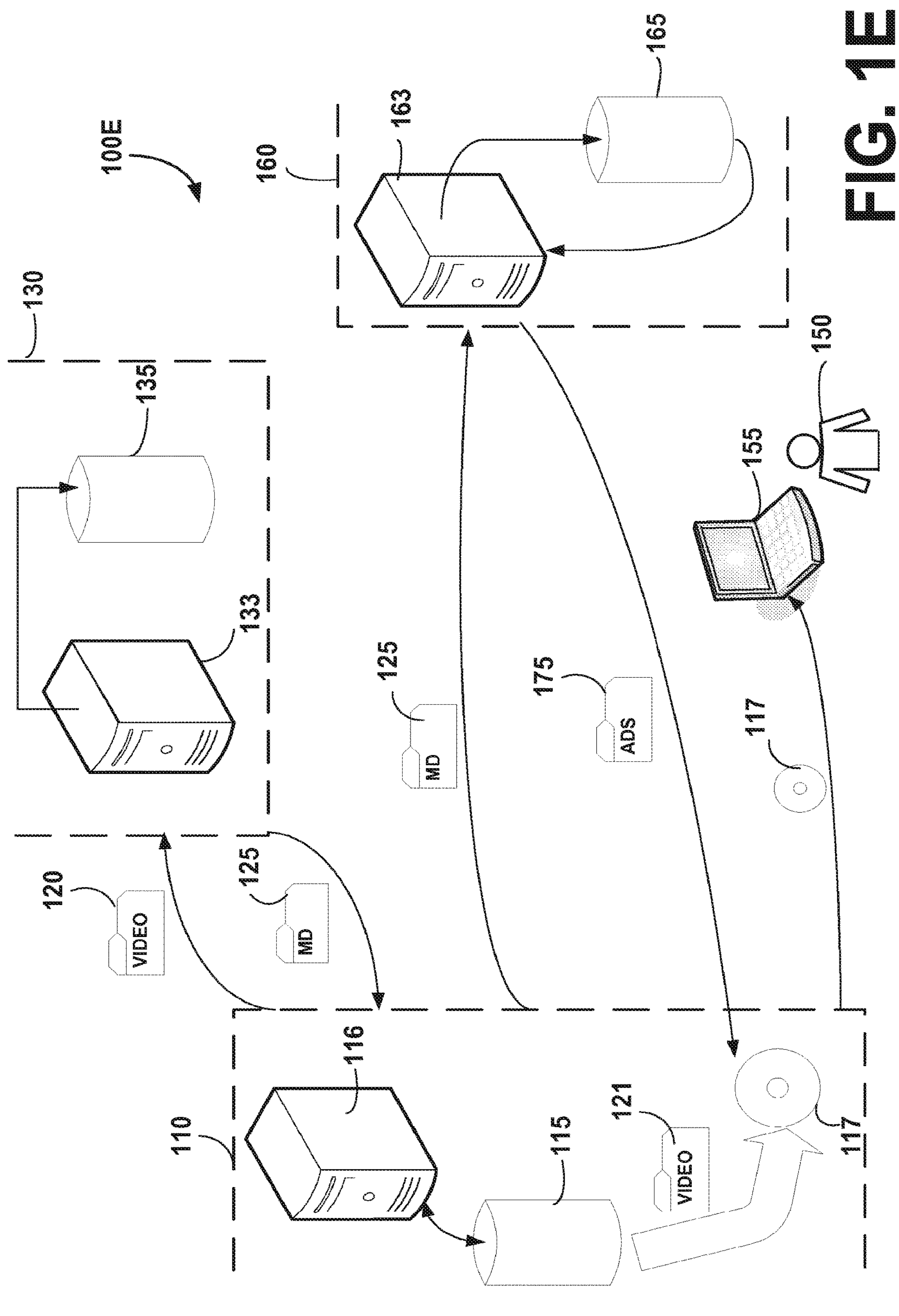
FIG. 1E illustrates a fifth embodiment of an advertisement placement system of the present invention.

Turning now to FIG. 1E, a fifth preferred embodiment of an advertisement placement system 100E based primarily upon time-coded metadata associated with an underlying video program displayed therewith is illustrated. In this embodiment, it is contemplated that the video program is actually provided or sold to the viewer 150 on a DVD 117 or similar storage medium, or is provided as a file download (not shown) (as opposed to a mere video streaming in which the file is not actually downloaded) for later playback. This embodiment is similar to the first embodiment to the extent that the underlying metadata file associated with the video program, once created, is maintained by the video provider 110. This system 100E includes one or more video storage databases 115 of the video provider 110 and a video manager 116 that communicates with the metadata generator 130, the advertisement distributor 160, and the video storage databases 115, and which manages the production of stored video programs 117 for distribution in DVD format or for download or the like.

Similar to the first embodiment, before a stored video program 117 is created and made available to an viewer 150, a video file 120 associated with the stored video program 117 is preferably provided to the metadata generator 130. The video file 120 has or includes a unique file name or other video identifier (designated herein by the variable VID). As will be described in greater detail hereinafter, the metadata generator 130 receives the video file 120 and, using a metadata processor 133, creates or generates a time-coded metadata file 125 associated with the corresponding video file 120 and underlying video program 121. This metadata file 125 is stored in a database 135 of the metadata generator 130 but is also provided back to the video provider 110 and associated with the corresponding video file 120 in video storage databases 115.

As part of the process for creating a stored video program 117, the metadata file 125 associated with the video file 120 is provided to the advertisement distributor 160, which uses an advertisement server 163 to process the metadata file 125 to selectively identify one or more appropriate advertisements from its database 165 of potential advertisements that is appropriate to provide in conjunction with the stored video program 117 and, specifically, with each discrete segment of the stored video program 117 based on its time-coded metadata. The selected advertisement file(s) 175 are then provided back to the video provider 110, which incorporates the advertisement files 175 directly on the stored video program 117 along with the actual video file 120. In this manner, the stored video program 117 has all necessary and desired advertisement files 175 built into the stored video program 117 and plays advertisements during viewing of the video in situations in which the video display device 155 does not (intentional, unintentional, non-compatible, or for whatever reason) have real time access to the Internet to obtain real-time advertisements associated with the video. The remaining aspects, variations, and alternatives of this embodiment are similar to those discussed in association with the first embodiment.

Figure 1F:
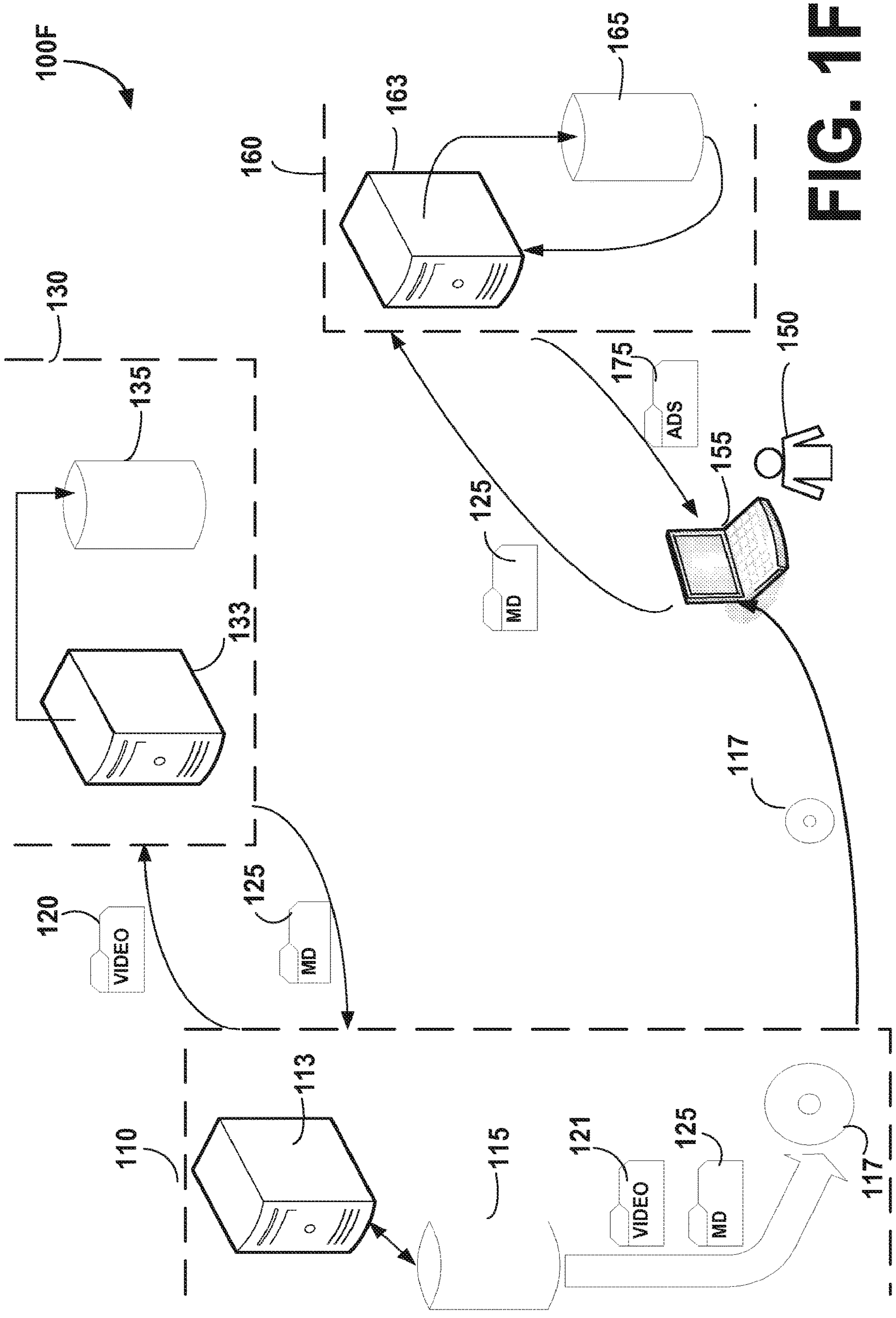
FIG. 1F illustrates a sixth embodiment of an advertisement placement system of the present invention.

Turning now to FIG. 1F, a sixth preferred embodiment of an advertisement placement system 100F based primarily upon time-coded metadata associated with an underlying video program displayed therewith is illustrated. This embodiment is similar to the fifth embodiment; however, it is contemplated that the video display device 155 has access to the Internet and, thus, is able to obtain real-time advertisement files 175 from advertisement distributor 160. This arrangement is preferred to the fifth embodiment since advertisements associated with the video program are not fixed and unchangeable on the stored video program 117 media. Instead, over time and with each viewing of the stored video program 117, the viewer 150, potentially, has a new advertisement experience.

For this reason, it is desirable to have the time-coded metadata file 125 actually stored on the stored video program 117 along with the video file 121 so that when the video program is actually being viewed by the viewer 150 on the video display device 155, the video display device 155 initiates a communication with the advertisement distributor 160 to provide the time-coded metadata file 125 and to receive back appropriate advertisement file(s) 175. Again, in an alternative arrangement, it may be desirable for the viewer 150 to provide or for the advertisement distributor 160 to have user or video display device characteristics 185 (as described in greater detail previously) so that the advertisement files 175 associated with the time-coded metadata of the stored video program 117 are tailored and targeted slightly more at the viewer 150, but still associated with the appropriate segment of the video program.

In an additional, alternative embodiment (not shown), the embodiments shown in FIGS. 1E and 1F are combined to store a base set of advertisement files 175 on the stored video program 117. The advertisement files 175 are for situations in which the video display device 155 is "offline" and does not have access to the Internet. The video display device 155 (or the software associated with the stored video program 117) is configured to interact in real time with the advertisement distributor 160 to obtain current and up-to-date advertisement files 175 when it is actually able to access the Internet and communicate with the advertisement distributor 160. In such a scenario, the more up-to-date advertisement files 175 are shown during the video playback if they are available. If they are not available, the pre-stored, base advertisement files 175 are used.

It should also be understood that there are many other alternative arrangements and variations of how and where various files are stored and provided. The embodiments shown in FIGS. 1A through 1F represent just some of the more likely arrangements and components involved. Additionally, there may be multiple additional parties involved such that the roles and responsibilities for providing and receiving files, for processing files, and for exchanging and storing data can be handled by different parties or components. For example, there may be two separate parties or components used to generate time-coded metadata files and to store and provide such time-coded metadata files to third parties upon request. Likewise, the video provider may want to act as the throughput for the advertisement distributor so that the video display device never interacts directly with a specified advertisement distributor. This can be controlled more easily in the video streaming context, since the links to the advertisement distributor can be dynamically changed over time to point to the preferred or desired advertisement distributor associated with the video provider. For the stored video program embodiments, it may be desirable to have advertisement links that go back through the video provider—this would enable the video provider to update and change the advertisement distributor used over longer periods of time and prevent such links, hard-coded onto the stored video program from becoming obsolete or broken.

Figure 3:
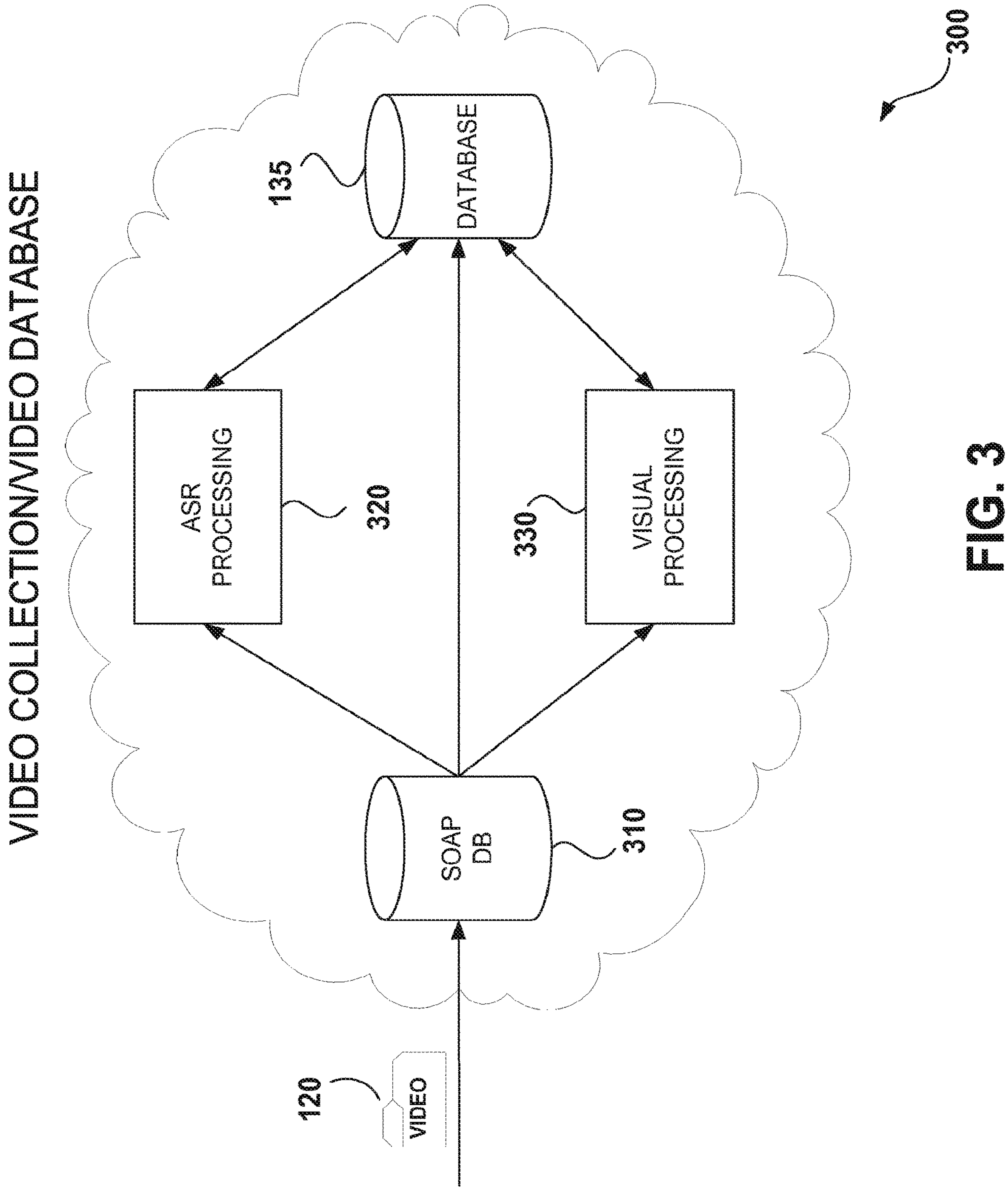
FIG. 3 illustrates a high level intake system for receiving video files and generating underlying time-coded metadata.

FIGS. 3 through 5B provide more detailed explanations are described for the creation of time-coded metadata files associated with underlying video programs. Turning first to FIG. 3, a high level view 300 of the intake process for creating a time-coded metadata file 125 is described. The metadata generator 130 receives the video file 120, which has or includes a unique file name or other video identifier (designated herein by the variable VID). The video file 120 and identifier are stored initially in a SOAP database 310. Preferably, the video file 120 is received in .mp4 (MPEG 4) format or, if not, is converted to such (or similar) format, as may be changed or updated from time to time. A hash of this file is run to generate a unique "video signature" and is checked against the existing video signatures stored in the database 135 to determine if a time-coded metadata file already exists for the video file 120 received. If so, the appropriate time-coded metadata file 125 is provided to any requesting party. If the file does not exist, the video file in .mp4 format is then provided to an audio processor 320 and to a video processor 330. Once the audio and video have been parsed and used to identify underlying metadata of the video program, the time-coded metadata file is stored in database 135 and is available for distribution or use, as described in association with the embodiments of FIGS. 1A through 1F.

Figure 4:
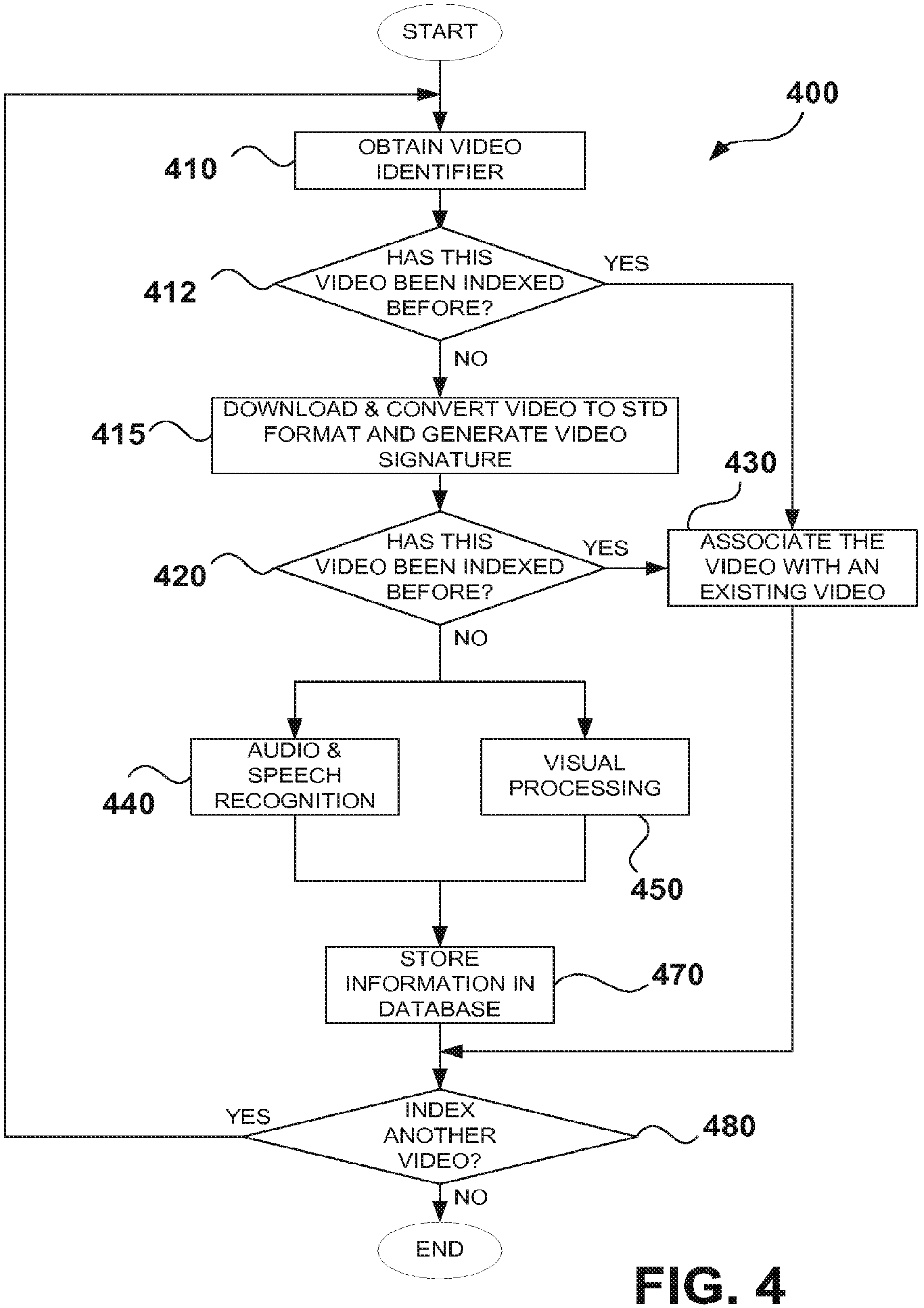
FIG. 4 illustrates a more detailed flow chart describing the extraction of metadata from a video signal.

FIG. 4 illustrates, in more detail, the steps 400 performed by the metadata processor 133 when a video file 120 is received for intake and processing. First, the video identifier is obtained from the video provider (step 410). As stated previously, this identifier may simply be the file name for the video file or it may be the title and year of the video file or something similar. Based on this identifier, it is possible to determine whether this particular video had been previously processed (step 412). If the video had already been processed previously, the database storing such time-coded metadata file is updated and cross-referenced with the identifier and existing video signature (step 430), then the process jumps to step 480 and determines whether another video needs to be processed or not. If the video had not been processed previously, at least based on its identifier, the system then downloads or receives the full video file from the video provider for further processing (step 415). As part of step 415, the video file is converted to .mp4 (MPEG 4) format, if it is not already in such format, and a hash or "video signature" of the .mp4 version of the video is created. Based on this video signature, it is possible to determine whether this particular video had been previously processed, even if the video identifier did not match a previously-known identifier (step 420). If the video had already been processed previously, the database storing such time-coded metadata files is updated and cross-referenced with the additional identifier and video signature, if necessary (step 430), then the process jumps to step 480 and determines whether another video needs to be processed or not. If the video had not been processed previously, it is then submitted to an audio processor (step 440) for audio capture and separation and speech recognition (among other things) and a video processor (step 450) for classification and analysis (among other things). The resulting metadata is compiled, tied to or associated with the underlying timecode of the video program, and stored in the metadata database (step 470). The process then determines whether there is another video to be processed (step 480). If so, the process 400 starts over. If not, the process 400 ends.

Generally, when a video program is received or converted to .mp4 format, an underlying time-code exists or is established for the video program. All audio and video metadata identified or extracted from the video program by the metadata processor 133 is then tied or associated with specific points or regions within the time code. Initially, key identifiers for the video program are determined and identified. This includes all characters who appear in the video program, key or reoccurring scene locations, key props and objects, key terms, etc. The key identifiers are typically audio features and/or video features, and are extracted from the video signal. Then, the video portion of the video program is parsed and divided into "short clips" or discrete segments. Such segments can be specified by a predetermined time frame, but can alternatively be identified based on information within the video signal, such as, for example, a change of camera shots, angles, scene change, scene break or the like. It should also be noted that different video segments can be defined by different predetermined time frames.

Once the video signal is divided, then each segmented video clip is then digitized. The breaks between each segment is identified and tied to the time-code timeline. Next, the metadata processor 133 runs a language and speech recognition process through the entire video and associates all of the dialogue and background audio with the appropriate video segments and time-codes. Next, characters within the video signal are associated with each of the dialogue entries. Finally, the metadata processor 133 runs a number of visual processing programs to identify characters, objects, scenes within each segment of the video program. Each identified audio feature is thus associated with at least one segmented video clip. Similarly, each identified video feature is also associated with at least one segmented video clip.

The associated metadata file enables selection of a relevant advertisement for presentment in conjunction with each respective digitized video clip of the corresponding video signal based on the associated audio features and the associated video features of the respective digitized video clip. Those of skill in the art will readily appreciate that presentment is typically implemented by a visual display device, but may also include email, file delivery, and other delivery methods.

The video features identified by the visual processor include at least one of (i) people, (ii) characters, (iii) animals, (iv) objects, (v) geographic locations, (vi) background, (vii) scenes, or a combination of any of these features. Preferably, these video features are extracted by a visual processing system of the feature extraction system. In one embodiment, the method includes the step of identifying and recognizing one or more objects from the video signal by an object classification system of the feature extraction system. In another embodiment, the method includes the step of identifying and recognizing one or more scenes from the video signal by a scene classification system of the feature extraction system. In yet another embodiment, the method includes a combination of both steps.

Audio features of the audio signal includes at least one of (i) a list of one or more words, (ii) speeches by one or more people, (iii) dialogue by one or more people, (iv) music, (v) background sound, and a combination of these audio features. The method further includes the steps of: (i) identifying and recognizing one or more background sounds from the audio signal by using a sound classification system of the feature extraction system, (ii) identify and recognizing one or more music segments from the audio signal by using a music classification system of the feature extraction system, and (iii) identifying and recognizing human speech, dialogues, one or more words, one or more phrases by using a speech recognition system of the feature extraction system. The method further includes the steps of: (i) collecting audio features of the audio signal by using audio signal recognition system of the feature extraction system, and (ii) saving the collected audio features in the metadata file.

Preferably, the metadata file is in XML format. An exemplary portion of a time-coded metadata file, in XML format, is illustrated in FIGS. 5A and 5B. The metadata file contains one or more of (i) video identification information, (ii) a file name, (iii) a digital signature, (iv) the length of the video signal, (v) a keyword list, (vi) a time-coded transcript, (vii) one or more segments with a corresponding start and stop time, (viii) one or more contents, (ix) one or more characters, (x) one or more animals, (xi) one or more objects, and (xii) a list of vocabulary.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method of generating for display video programs enabling selection of selected media content using time-based metadata, comprising:

extracting, by a server, audio and video features from the video program;

in response to determining that the audio and video features have been previously processed;

updating a database storing an existing time-based metadata file associated with the video program; and cross referencing the database with an identifier and existing video signature for the selected media content;

in response to determining that the audio and video features have not been previously processed:

identifying, by the server, extracted audio features from the video program using audio processing, where each of the audio features includes corresponding start and stop time codes associated therewith;

identifying, by the server, extracted video features from the video program using visual processing, where each of the video features includes corresponding start and stop time codes associated therewith;

saving, by the server, the extracted audio features and extracted video features in a new time-based metadata file;

storing, by the server, the new time-based metadata file in a database;

transmitting, by the server, via a network, the video program to a video display device which is a separate device from the server that can be accessed by the server via the network;

associating, by the server, the updated database with the time-based metadata file or the new time-based metadata file with the video program, the video program being transmitted to the video display device of an end user without advertisements selected by an advertising distributor;

simultaneous to the transmission by the server of the video program to the video display device, transmitting, by the same server, via a network, the updated database with the time-based metadata file or the new time-based metadata file to an advertising distributor that selects the advertisements based at least in part on the time-based metadata, wherein the advertising distributor is a device that is separate from the server and the video display device that can be accessed by the server via the network;

receiving, by the server, selected advertisements from the advertising distributor; and generating for display, by the server, the selected advertisements on the video display device targeted and customized for the end user based upon the updated database with the time-based metadata file or the new time-based metadata file provided to the advertising distributor, wherein the updated database with the time-based metadata file or the new time-based metadata file provides time-coded information about the video program to enable selection of appropriate advertisements for presentment at specific time-code locations within the video program during viewing or playback of the video program by the end user.

2. The method of claim 1, where the updated database with the time-based metadata file or the new time-based metadata file is in an XML file format.

3. The method of claim 1, where the extracted video features include one or more of actors, characters, animals, objects, geographic locations, background, setting, theme, events, and scenes.

4. The method of claim 1, where the extracted audio features include one or more of words, speeches, dialogue, music, discrete sounds, and background noise.

5. The method of claim 1, wherein the advertisements include at least one advertisement that is identified and cued to be presented to the end user when the video program reaches a respective time code location within the video program and wherein the at least one advertisement correlates to at least one of the extracted video features obtained from the updated database with the time-based metadata file or the new time-based metadata file that appears in the video program during the respective time code location.

6. The method of claim 1, wherein the advertisements include at least one advertisement that is identified and cued to be presented to the end user when the video program reaches a respective time code location within the video program and wherein the at least one advertisement correlates to at least one of the extracted audio features obtained from the updated database with the time-based metadata file or the new time-based metadata file that occurs in the video program during the respective time code location.

7. The method of claim 1, wherein the advertisements include at least one advertisement that is identified and cued to be presented to the end user when the video program reaches a respective time code location within the video program and wherein the at least one advertisement correlates to at least one of the extracted video features and to at least one of the extracted audio features obtained from the updated database with the time-based metadata file or the new time-based metadata file that appears and occurs in the video program during the respective time code location.

8. The method of claim 1, wherein the updated database with the time-based metadata file or the new time-based metadata file comprises one or more of: (a) identification of the associated video program; (b) a file name; (c) a digital signature; (d) the time-coded duration of the associated video program; (e) a keyword list; (f) a time-coded transcript; and (g) one or more segments of the video program, each segment having a corresponding start and stop time and each segment identifying video features and audio features associated with each said segment.

9. One or more non-transitory machine-readable media generating for display video programs enabling selection of selected media content using time-based metadata storing instructions which, when executed by one or more processors, cause:

extracting, by a server, audio and video features from the video program;

in response to determining that the audio and video features have been previously processed;

updating a database storing an existing time-based metadata file associated with the video program; and cross referencing the database with an identifier and existing video signature for the selected media content;

in response to determining that the audio and video features have not been previously processed:

identifying, by the server, extracted audio features from the video program using audio processing, where each of the audio features includes corresponding start and stop time codes associated therewith;

identifying, by the server, extracted video features from the video program using visual processing, where each of the video features includes corresponding start and stop time codes associated therewith;

saving, by the server, the extracted audio features and extracted video features in a new time-based metadata file;

storing, by the server, the new time-based metadata file in a database;

transmitting, by the server, via a network, the video program to a video display device which is a separate device from the server that can be accessed by the server via the network;

associating, by the server, the updated database with the time-based metadata file or the new time-based metadata file with the video program, the video program being transmitted to the video display device of an end user without advertisements selected by an advertising distributor;

simultaneous to the transmission by the server of the video program to the video display device, transmitting, by the same server, via a network the updated database with the time-based metadata file or the new time-based metadata file to an advertising distributor that selects the advertisements based at least in part on the time-based metadata, wherein the advertising distributor is a device that is separate from the server and the video display device that can be accessed by the server via the network;

receiving, by the server, selected advertisements from the advertising distributor; and generating for display, by the server, the selected advertisements on the video display device targeted and customized for the end user based upon the updated database with the time-based metadata file or the new time-based metadata file provided to the advertising distributor, wherein the updated database with the time-based metadata file or the new time-based metadata file provides time-coded information about the video program to enable selection of appropriate advertisements for presentment at specific time-code locations within the video program during viewing or playback of the video program by the end user.

10. The one or more non-transitory machine-readable media of claim 9, where the updated database with the time-based metadata file or the new time-based metadata file is in an XML file format.

11. The one or more non-transitory machine-readable media of claim 9, wherein each of the plurality of video segments is automatically identified based on at least one of a change of camera shot, a change of camera angle, a scene change, or a scene break.

12. The one or more non-transitory machine-readable media of claim 9, wherein the video program is provided to the video display device over the Internet, from a DVD, or a physical media storage.

13. The one or more non-transitory machine-readable media of claim 9, wherein the advertisements include at least one advertisement that is identified and cued to be presented to the end user when the video program reaches a respective time code location within the video program and wherein the at least one advertisement correlates to at least one of the extracted video features obtained from the updated database with the time-based metadata file or the new time-based metadata file that appears in the video program during the respective time code location.

14. The one or more non-transitory machine-readable media of claim 9, wherein the advertisements include at least one advertisement that is identified and cued to be presented to the end user when the video program reaches a respective time code location within the video program and wherein the at least one advertisement correlates to at least one of the extracted audio features obtained from the updated database with the time-based metadata file or the new time-based metadata file that occurs in the video program during the respective time code location.

15. The one or more non-transitory machine-readable media of claim 9, wherein the advertisements include at least one advertisement that is identified and cued to be presented to the end user when the video program reaches a respective time code location within the video program and wherein the at least one advertisement correlates to at least one of the extracted video features and to at least one of the extracted audio features obtained from the updated database with the time-based metadata file or the new time-based metadata file that appears and occurs in the video program during the respective time code location.

16. The one or more non-transitory machine-readable media of claim 9, wherein the updated database with the time-based metadata file or the new time-based metadata file comprises one or more of: (a) identification of the associated video program; (b) a file name; (c) a digital signature; (d) the time-coded duration of the associated video program; (e) a keyword list; (f) a time-coded transcript; and (g) one or more segments of the video program, each segment having a corresponding start and stop time and each segment identifying video features and audio features associated with each said segment.

17. An apparatus generating for display video programs enabling selection of selected media content using time-based metadata, comprising:

a subsystem, implemented at least in part in hardware, that extracts, by a server, audio and video features from the video program;

a subsystem, implemented at least in part in hardware, that in response to determining that the audio and video features have been previously processed;

updates a database storing an existing time-based metadata file associated with the video program; and cross references the database with an identifier and existing video signature for the selected media content;

a subsystem, implemented at least in part in hardware, that in response to determining that the audio and video features have not been previously processed:

identifies, by the server, extracted audio features from the video program using audio processing, where each of the audio features includes corresponding start and stop time codes associated therewith;

identifies, by the server, extracted video features from the video program using visual processing, where each of the video features includes corresponding start and stop time codes associated therewith;

saves, by the server, the extracted audio features and extracted video features in a new time-based metadata file;

stores, by the server, the new time-based metadata file in a database;

a subsystem, implemented at least in part in hardware, that transmits, by the server, the video program to a video display device, which is a separate device from the server that can be accessed by the server via the network;

a subsystem, implemented at least in part in hardware, that associates, by the server, the updated database with the time-based metadata file or the new time-based metadata file with the video program, the video program being transmitted to the video display device of an end user without advertisements selected by an advertising distributor;

a subsystem, implemented at least in part in hardware, that, simultaneous to the transmission by the server, via a network, of the video program to the video display device, transmitting, by the same server, via a network the updated database with the time-based metadata file or the new time-based metadata file to an advertising distributor that selects the advertisements based at least in part on the time-based metadata, wherein the advertising distributor is a device that is separate from the server and the video display device that can be accessed by the server via the network;

a subsystem, implemented at least in part in hardware, that receives, by the server, selected advertisements from the advertising distributor, and generates, by the server, for display the selected advertisements on the video display device from the advertising distributor targeted and customized for the end user based upon the updated database with the time-based metadata file or the new time-based metadata file provided to the advertising distributor, wherein the updated database with the time-based metadata file or the new time-based metadata file provides time-coded information about the video program to enable selection of appropriate advertisements for presentment at specific time-code locations within the video program during viewing or playback of the video program by the end user.

18. The apparatus of claim 17, where the updated database with the time-based metadata file or the new time-based metadata file is in an XML file format.

19. The apparatus of claim 17, wherein each of the plurality of video segments is automatically identified based on at least one of a change of camera shot, a change of camera angle, a scene change, or a scene break.

20. The apparatus of claim 17, wherein the video program is provided to the video display device over the Internet, from a DVD, or a physical media storage.

21. The apparatus of claim 17, wherein the at least one advertisement is identified and cued to be presented to the end user when the video program reaches a respective time code location within the video program and wherein the at least one advertisement correlates to at least one of the extracted video features obtained from the updated database with the time-based metadata file or the new time-based metadata file that appears in the video program during the respective time code location.

22. The apparatus of claim 17, wherein the advertisements include at least one advertisement that is identified and cued to be presented to the end user when the video program reaches a respective time code location within the video program and wherein the at least one advertisement correlates to at least one of the extracted audio features obtained from the updated database with the time-based metadata file or the new time-based metadata file that occurs in the video program during the respective time code location.

23. The apparatus of claim 17, wherein the advertisements include at least one advertisement that is identified and cued to be presented to the end user when the video program reaches a respective time code location within the video program and wherein the at least one advertisement correlates to at least one of the extracted video features and to at least one of the extracted audio features obtained from the updated database with the time-based metadata file or the new time-based metadata file that appears and occurs in the video program during the respective time code location.

24. The apparatus of claim 17, wherein the updated database with the time-based metadata file or the new time-based metadata file comprises one or more of: (a) identification of the associated video program; (b) a file name; (c) a digital signature; (d) the time-coded duration of the associated video program; (e) a keyword list; (f) a time-coded transcript; and (g) one or more segments of the video program, each segment having a corresponding start and stop time and each segment identifying video features and audio features associated with each said segment.

* * * * *